June 25, 1957 — H. T. WHITE — 2,796,835
MOTOR DRIVEN PUMPS
Filed July 30, 1954

INVENTOR.
HOWARD T. WHITE
BY
ATTORNEY

United States Patent Office
2,796,835
Patented June 25, 1957

2,796,835

MOTOR DRIVEN PUMPS

Howard T. White, Melrose Park, Pa.

Application July 30, 1954, Serial No. 446,930

5 Claims. (Cl. 103—87)

This invention relates to motor driven pumps.

It is the principal object of the present invention to provide a motor driven pump which is constructed of a relatively small number of parts, is simple in construction and easy to assemble and disassemble.

It is a further object of the present invention to provide a motor driven pump having a motor stator chamber isolated from the fluid being pumped and in which the isolation is accomplished in an improved manner.

It is a further object of the present invention to provide a motor driven pump in which the rotor is mounted in an improved manner to permit of cooling and bearing lubrication.

Other objects and advantageous features will be apparent from the specification and claims.

Figure 1:
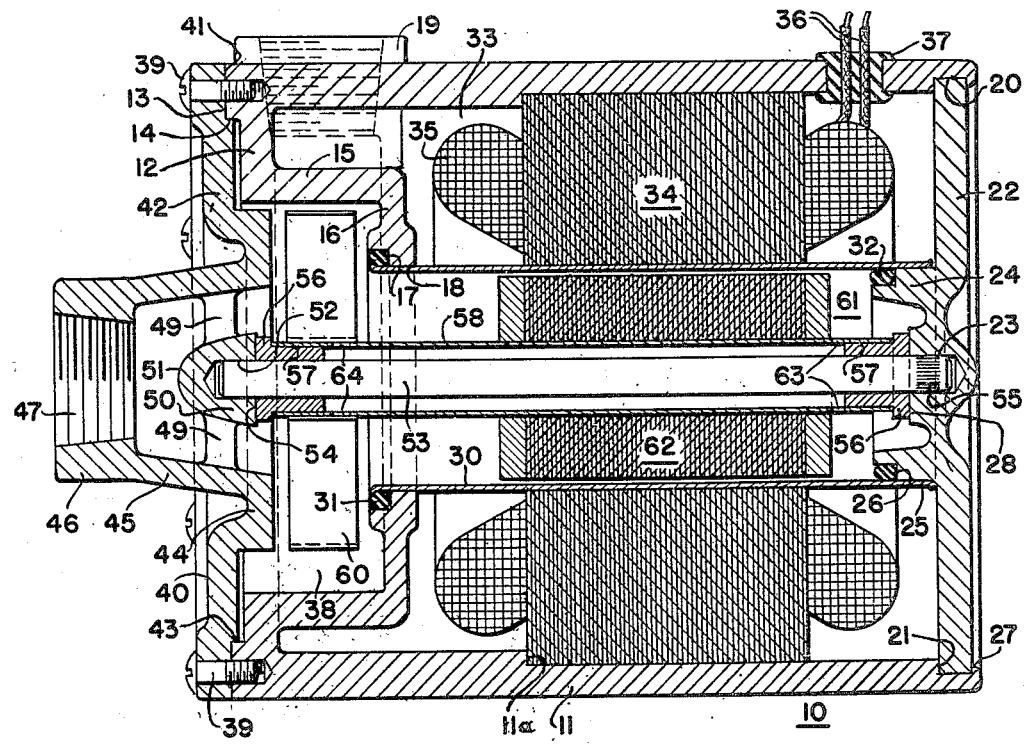
Figure 2:
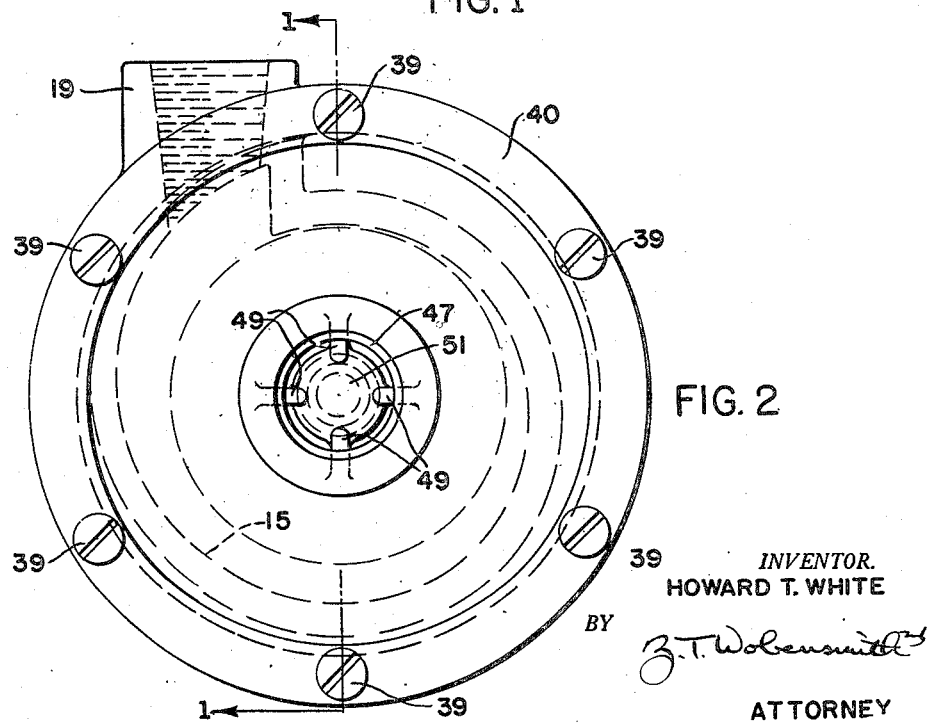

The nature and characteristic features of the invention will be more readily understood from the following description, taken in connection with the accompanying drawings forming part thereof, in which:

Figure 1 is a vertical central sectional view taken approximately on the line 1—1 of Fig. 2; and Fig. 2 is an end elevational view as seen from the left of Fig. 1.

It should, of course, be understood that the description and drawings herein are illustrative merely, and that various modifications and changes may be made in the structure disclosed without departing from the spirit of the invention.

Referring now more particularly to the drawings, the motor driven pump therein illustrated preferably includes a stator housing 10 having an outer axial hollow cylindrical wall portion 11, and a diametrically or transverse inwardly extending integral wall portion 12 inset to provide an outer end rim 13 with an inner annular face 14.

The wall portion 12, spaced inwardly from the cylindrical portion 11, is provided with an axially disposed integral scroll 15 from which a diametrically inwardly extending integral wall portion 16 extends, the wall portion 16 being spaced axially from the wall portion 12. The inner terminus of the wall portion 16 is enlarged, has a recess 17 on one face thereof and has an inner cylindrical face 18 for purposes to be explained.

The housing 10, in communication with the interior of the scroll 15, and extending through the wall portion 11, is provided with a fluid delivery connection 19 for the discharge of the fluid being pumped.

The housing 10, at the end opposite the end rim 13, has a recess 20 with an inner end terminus 21 for the reception of a rear cover or end plate 22.

The end plate 22 at the central portion thereof has an axial bore 23 from which a diametrical face 28 extends outwardly, and spaced outwardly therefrom an axially inwardly extending rim 24 with an outer annular face 25 and a recess 26.

The end plate 22 is preferably held in position in the recess 20, and in fluid tight relation to the wall portion 11, by staking the end portion of the housing 10, as indicated at 27.

Interposed between the rim 24, engaging the outer face 25 thereof, and the inner enlarged terminus of the wall portion 16, engaging the inner face 18 thereof, a cylindrical sleeve 30 of non-magnetic responsive material, such as stainless steel, is provided in relatively tight engagement. Sealing rings 31 and 32, preferably O-rings, are provided in the recesses 17 and 26 to insure a fluid tight joint at these locations. An isolated, sealed and fluid tight stator chamber 33 is thus provided in the space between the wall portion 11 and the sleeve 30, and between the end plate 22 and the wall portions 12, 15 and 16.

Within the stator chamber 33, motor stator laminations 34 and field windings 35 are inserted prior to closing. The stator laminations 34 may be positioned by an interior shoulder 11a. Power leads 36 are provided in a sealing ring 37 in the wall portion 11. The leads 36 may be connected to any suitable source of alternating current.

At the end of the housing 10 at which the end rim 13 is provided, an intake end plate 40 is mounted. The end plate 40 has an outer diametrically disposed face portion 41 for engagement with the diametrical face of the rim 13, an intermediate inwardly inset portion 42 with an inner annular end face 43 for engagement with the face portion 14, an inwardly inset wall portion 44 in spaced relation to the wall portion 16, a frusto-conical axially disposed and outwardly extending hollow portion 45 and an end terminal portion 46 with a central fluid inlet opening 47 for the reception of a fluid inlet or supply pipe (not shown). The space within the scroll 15 and between the wall portions 16 and 41 provides an impeller chamber 38.

The end plate 40 is held in position on the housing 10 by bolts 39 extending therethrough and into the housing 10.

Within the interior of the frusto-conical portion 45, a plurality of ribs 49 are provided which extend inwardly to and support a boss 50, having a curved face portion 51 facing the inlet opening 47 to guide the entering fluid, and, opposite thereto, an axial bore 52, for the reception of a fixedly mounted shaft 53. A diametrical face 54 extends outwardly from the bore 52.

The shaft 53, at its other end, extends into the bore 23 in the end plate 22 and is preferably held against rotation by knurling or the like, as at 55.

Mounted on the shaft 53, spaced rotatable ring bearings 56, preferably of graphite or the like, are provided engaging respectively with the faces 28 and 54 to accommodate axial thrust. The bearings 56 have annular recesses 57 for the reception of a hollow rotatable sleeve impeller shaft 58 spaced from the shaft 53.

The shaft 58 has mounted on the portion thereof which extends within the scroll 15, a fluid impeller 60. The shaft 58 on the portion thereof within the sleeve 30, which constitutes a motor rotor chamber 61, and within the field from the laminations 34, has secured thereto a motor rotor 62, preferably of the short circuited type.

The shaft 58 is provided inwardly of the bearings 56 with spaced openings 63 and 64 for the circulation by by passing of a portion of the fluid being pumped for cooling the motor rotor 62, and the bearings 56 and lubricating the bearings 56.

The mode of operation will now be briefly described.

Fluid enters at the fluid inlet opening 47, is guided by the curved face portion 51, passes through the frusto-conical portion 45 and into the impeller chamber 38, within the scroll 15, where, by the action of the impeller 60 it is delivered to the fluid delivery connection 19.

Rotation of the impeller shaft 58, and the bearings 56 on which it is mounted is effected by the action of the rotating field set up in the laminations 34 upon energization of the windings 35, upon the motor rotor 62.

As fluid is being pumped, a portion thereof will move axially in the space between the sleeve 30 and the motor rotor 62, then through the opening 63 and axially in the space between the fixed shaft 53 and the impeller shaft 58, then through the opening 64 where it mingles with the other fluid being pumped. In this passage the bypassed fluid is effective for cooling and lubrication, particularly of the bearing 56 at the end plate 22.

Access to the impeller 60, as well as to the shaft 58, the bearings 56 and the motor rotor 62, may be readily had, if desired upon removal of the bolts 39 and outward axial withdrawal of the end plate 40.

I claim:

1. A motor driven pump having a housing with end closure members, one of said end closure members having a portion extending inwardly within said housing and providing an impeller chamber therein, an end closure plate for said impeller chamber, said housing having fluid inlet and outlet connections communicating with said impeller chamber, said housing having a cylindrical sleeve therein extending between and having its ends engaging said end closure members and providing therewith a motor stator chamber axially spaced from said impeller chamber, the interior of said sleeve providing a motor rotor chamber, a motor stator in said motor stator chamber, an axially disposed shaft fixedly mounted in said end closure plate and the other of said end closure members, a hollow rotatable shaft concentrically journaled on said fixedly mounted shaft, and an impeller in said impeller chamber and a motor rotor in said motor rotor chamber mounted on said rotatable shaft for rotation therewith.

2. A motor driven pump comprising a motor housing having an outer axial hollow cylindrical wall, an end closure wall at one end of said cylindrical wall and a transversely and axially inwardly extending wall at the other end of said cylindrical wall, a sleeve connecting said end closure wall and said axially extending wall and providing therewith and with said outer wall a closed motor stator chamber, the interior space in said sleeve providing a motor rotor chamber, a motor stator in said motor stator chamber, an end closure plate for the end of said motor housing and spaced from said axially extending wall to provide an impeller chamber, a central axial shaft extending between said end closure wall and said closure plate and fixedly mounted with respect thereto, a rotatable shaft concentrically mounted on said fixed shaft, and an impeller in said impeller chamber and a motor rotor in said motor rotor chamber mounted on said rotatable shaft for rotation therewith.

3. A motor driven pump comprising a motor housing having an outer axial hollow cylindrical wall, an end closure wall at one end of said cylindrical wall and a transversely and axially inwardly extending wall at the other end of said cylindrical wall, a sleeve connecting said end closure wall and said axially extending wall and providing therewith and with said outer wall a closed motor stator chamber, the interior space in said sleeve providing a motor rotor chamber, a motor stator in said motor stator chamber, an end closure plate for the end of said motor housing and spaced from said axially extending wall to provide an impeller chamber, a central axial shaft extending between said end closure wall and said closure plate and fixedly mounted with respect thereto, a hollow rotatable shaft concentrically mounted on said fixed shaft in spaced relation thereto, said rotatable shaft having openings for fluid flow, and an impeller in said impeller chamber and a motor rotor in said motor chamber mounted on said rotatable shaft for rotation therewith.

4. A motor driven pump comprising a motor housing having an outer axial hollow cylindrical wall, an end closure wall at one end of said cylindrical wall and a transversely and axially inwardly extending wall at the other end of said cylindrical wall, a sleeve connecting said end closure wall and said axially extending wall and providing therewith and with said outer wall a closed motor stator chamber, the interior space in said sleeve providing a motor rotor chamber, a motor stator in said motor stator chamber, an end closure plate for the end of said motor housing and spaced from said axially extending wall to provide an impeller chamber, a central axial shaft extending between said end closure wall and said closure plate and fixedly mounted with respect thereto, a hollow rotatable shaft concentrically mounted on said fixed shaft in spaced relation thereto, spaced bearings interposed between said shafts and engaging portions of said end closure wall and said end closure plate, said rotatable shaft having openings for fluid flow, and an impeller in said impeller chamber and a motor rotor in said motor chamber mounted on said rotatable shaft for rotation therewith.

5. A motor driven pump comprising a motor housing having an outer axial hollow cylindrical wall, an end closure wall rigidly mounted at one end of said cylindrical wall and a transversely and axially inwardly extending integral closure wall at the other end of said cylindrical wall, a sleeve connecting said end closure wall and said last wall, sealing members carried by said closure walls and engaging said sleeve, said sleeve providing with said end closure walls and with said outer wall a closed motor stator chamber, the interior space in said sleeve providing a motor rotor chamber, a motor stator in said motor stator chamber, an end closure plate for the end of said motor housing and spaced from said axially extending wall to provide an impeller chamber, a central axial shaft extending between said end closure wall and said closure plate and fixedly mounted with respect thereto, a hollow rotatable shaft concentrically mounted on said fixed shaft in spaced relation thereto, spaced bearings interposed between said shafts and engaging portions of said end closure wall and said end closure plate, said rotatable shaft having openings for fluid flow, and an impeller in said impeller chamber and a motor rotor in said motor chamber mounted on said rotatable shaft for rotation therewith.

References Cited in the file of this patent

UNITED STATES PATENTS

| 2,649,048 | Pezzillo et al. | Aug. 18, 1953 |
| 2,725,012 | Zimsky | Nov. 29, 1955 |

FOREIGN PATENTS

| 289,479 | Switzerland | July 1, 1953 |